United States Patent
Rittmeyer

(10) Patent No.: US 7,152,301 B2
(45) Date of Patent: Dec. 26, 2006

(54) METHOD FOR WINDING A STATOR OF MULTI-PHASE MOTORS

(75) Inventor: Gregory Rittmeyer, Winnebago, IL (US)

(73) Assignee: Pacsci Motion Control, Inc., Wilmington, MA (US)

( * ) Notice: Subject to any disclaimer, the term of this patent is extended or adjusted under 35 U.S.C. 154(b) by 0 days.

(21) Appl. No.: 11/172,324

(22) Filed: Jun. 30, 2005

(65) Prior Publication Data

US 2005/0242678 A1    Nov. 3, 2005

Related U.S. Application Data

(62) Division of application No. 10/791,422, filed on Mar. 2, 2004.

(60) Provisional application No. 60/455,976, filed on Mar. 19, 2003.

(51) Int. Cl.
*H02K 15/00* (2006.01)
*H02K 1/00* (2006.01)
*H02K 3/00* (2006.01)
*H02K 19/26* (2006.01)

(52) U.S. Cl. .................... 29/596; 310/179; 310/180

(58) Field of Classification Search ............... 310/179, 310/71, 184, 180; 29/606, 596
See application file for complete search history.

(56) References Cited

U.S. PATENT DOCUMENTS

| 2,898,534 | A |   | 8/1959  | Rawcliffe            |
|-----------|---|---|---------|----------------------|
| 4,287,446 | A | * | 9/1981  | Lill et al. ............ 310/71 |
| 4,386,288 | A | * | 5/1983  | Laurie ............. 310/49 R |
| 4,752,707 | A | * | 6/1988  | Morrill ............. 310/184 |
| 5,498,917 | A |   | 3/1996  | Ninomiya et al.      |
| 5,729,072 | A |   | 3/1998  | Hirano et al.        |
| 5,770,910 | A | * | 6/1998  | Horst ............... 310/214 |
| 6,331,760 | B1 | * | 12/2001 | McLane, Jr. ......... 318/767 |
| 6,617,725 | B1 |   | 9/2003  | Rose, Sr.           |
| 6,784,584 | B1 | * | 8/2004  | Knoll et al. .......... 310/179 |
| 6,847,146 | B1 |   | 1/2005  | Hessenberger et al. |
| 2002/0011755 | A1 | * | 1/2002 | Shteynberg et al. ... 310/184 |

FOREIGN PATENT DOCUMENTS

JP    2001161049 A    6/2001

* cited by examiner

*Primary Examiner*—Tran Nguyen
*Assistant Examiner*—Erik Preston
(74) *Attorney, Agent, or Firm*—Greer, Burns & Crain, Ltd

(57) ABSTRACT

A method for winding a stator of a multi-phase motor includes successively winding each of a plurality of teeth on the stator with a continuous winding wire to connect each of the phases in the motor together. The wound wire is disconnected between any two phases where respective ends of the two phases connected by the winding wire are not neutral ends. A jumper wire is connected between a neutral end of any one of the phases to a neutral end of at least one other phase if the neutral end of any one of the phases is not connected to the neutral end of at least one other phase by the winding wire.

5 Claims, 11 Drawing Sheets

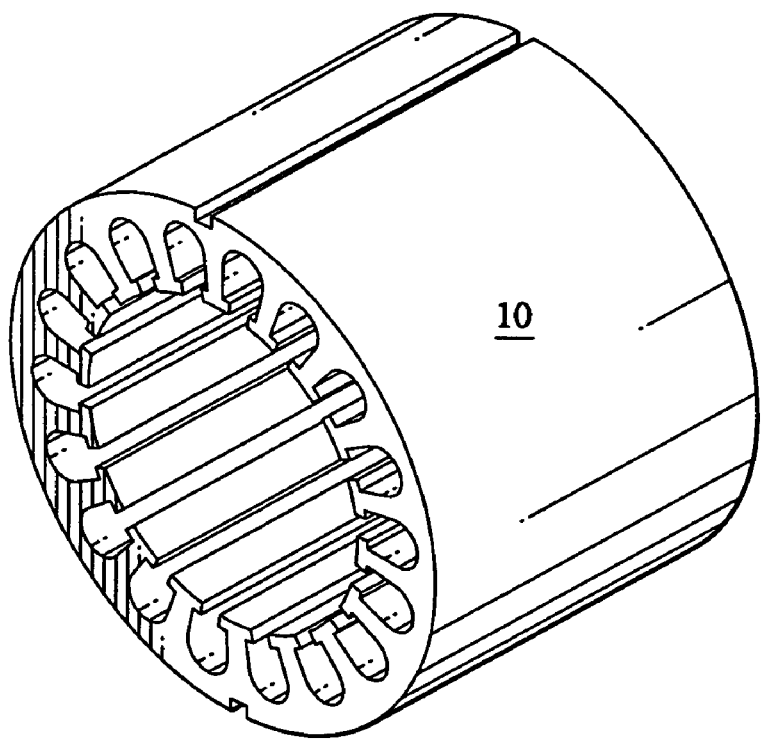
FIG. 1
FIG. 5
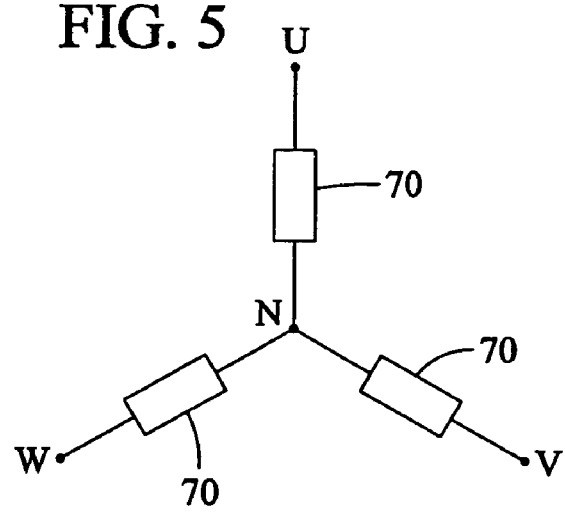

METHOD FOR WINDING A STATOR OF MULTI-PHASE MOTORS

This is a divisional of application Ser. No. 10/791,422, filed Mar. 2, 2004, which claims benefit of provisional application Ser. No. 60/455,976, filed Mar. 19, 2003.

BACKGROUND OF THE INVENTION

The present invention generally relates to multiple phase electric motors, and more particularly to the winding of coils during the manufacture of such motors.

Conventional brushless permanent magnet servomotor designs that are common in the marketplace include 4-pole rotor—12 slot stator motors; 4 pole—24 slot motors; 6 pole—18 slot motors; and 6 pole—36 slot motors, for example. An illustration of an 18-slot stator 10 is shown in FIG. 1. A typical winding pattern for two phases (U and V) of an 18-slot stator is shown in FIGS. 2 and 3. Because of the crossovers 12 of coils in the ends of the stator 10, the winding end-turns 14 tend to be long and bulky and add considerably to the winding resistance in the winding pattern shown in FIG. 2. This reduces the motor torque density. Also, in order to produce motors capable of running off servo amplifier bus voltages up to approximately 680 V DC, inter-phase insulation paper 16 must be routed between the coils of adjacent phases.

To avoid these issues many manufacturers have adapted motor topologies using single-tooth winding, so that each coil has a span of one lamination tooth. In order to utilize this topology, the ratio of motor slots to poles (S/P) must lie in the range of $0.5 < S/P \leq 1.5$. Single tooth winding significantly reduces the height of the winding heads 14 and eliminates crossovers 12 between coils of different phases, as shown in FIG. 4.

Two design classes are practiced in the construction of single tooth windings, the first being single piece lamination with needle winding and the second being segmented stators. With regard to the single piece lamination with needle winding, this practice has the advantage that the stator laminations are whole or single piece, allowing easier assembly of the stator pack. Prestack stator packs are desirable for volume production. The windings are placed in the slots with a needle winder which somewhat restricts the available winding space.

With regard to the segmented stator winding practice, there are many variations on this theme but all involve a segmented stator pack. The windings are wound in very high density either directly on the tooth or on separate bobbins and subsequently transferred onto the tooth. Bobbin winding requires some sacrifice of available winding area in order to get good layering, but very high density windings can be achieved. There is, however, an extra step of recombining the stator segments after winding placement.

Stator connection refers to the process of linking all the coils in each of the phases. In a three-phase stator connection, a star-point is formed from the ends of the coils of each phase and the starts of the three phases are brought to the outside world as shown in FIG. 5. For small motors it is commonplace to terminate the start and finish of each coil on terminal posts.

SUMMARY OF THE INVENTION

One embodiment of the present invention relates to a method for winding a stator of a multi-phase motor. The method includes successively winding each of a plurality of teeth on the stator with a continuous winding wire to connect each of the phases in the motor together. The wound wire is disconnected between any two phases where respective ends of the two phases connected by the winding wire are not neutral ends. A jumper wire is connected between a neutral end of any one of the phases to a neutral end of at least one other phase if the neutral end of that any one of the phase is not connected to the neutral end of that at least one phase by the winding wire.

DESCRIPTION OF THE DRAWINGS

FIG. 1 is a perspective view of an 18-slot stator;

FIG. 5 is a circuit diagram illustrating the connections of phases in a three-phase motor;

DETAILED DESCRIPTION OF THE PREFERRED EMBODIMENTS

Figure 2:
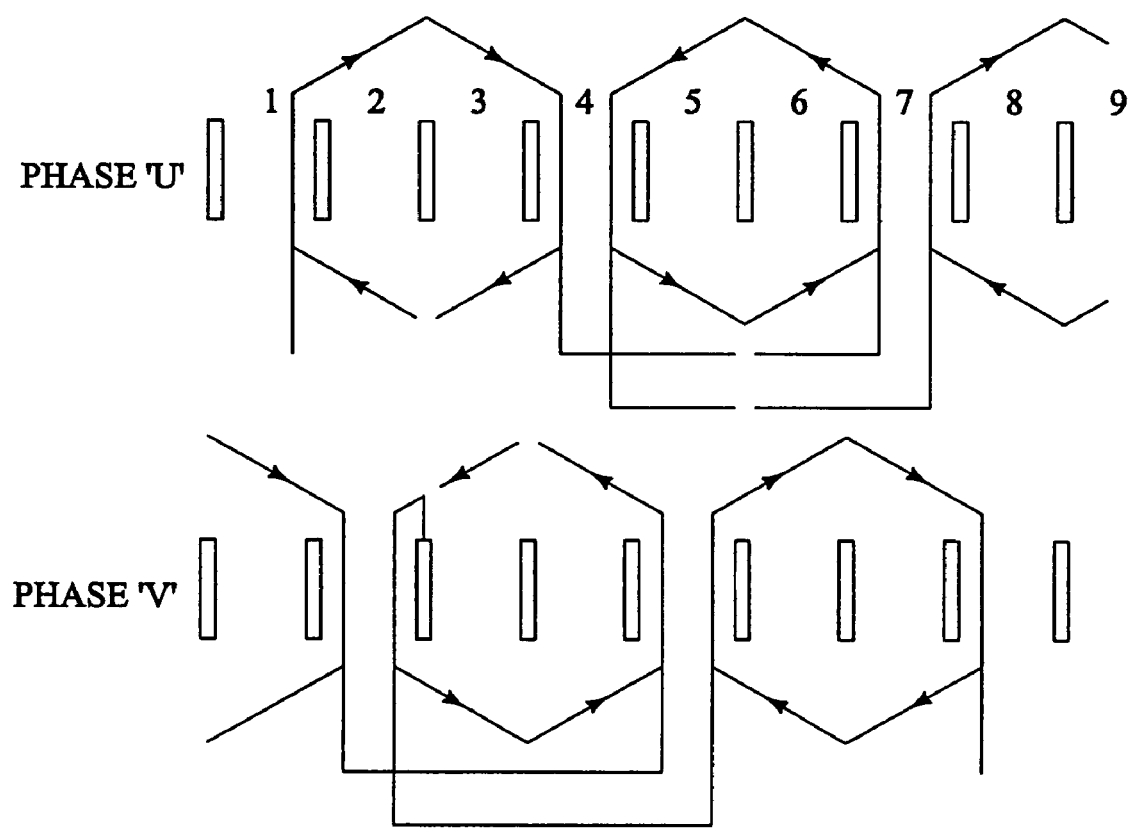
FIG. 2 is a diagram illustrating a conventional winding configuration for an 18-slot stator of a three-phase motor.
Figure 3:
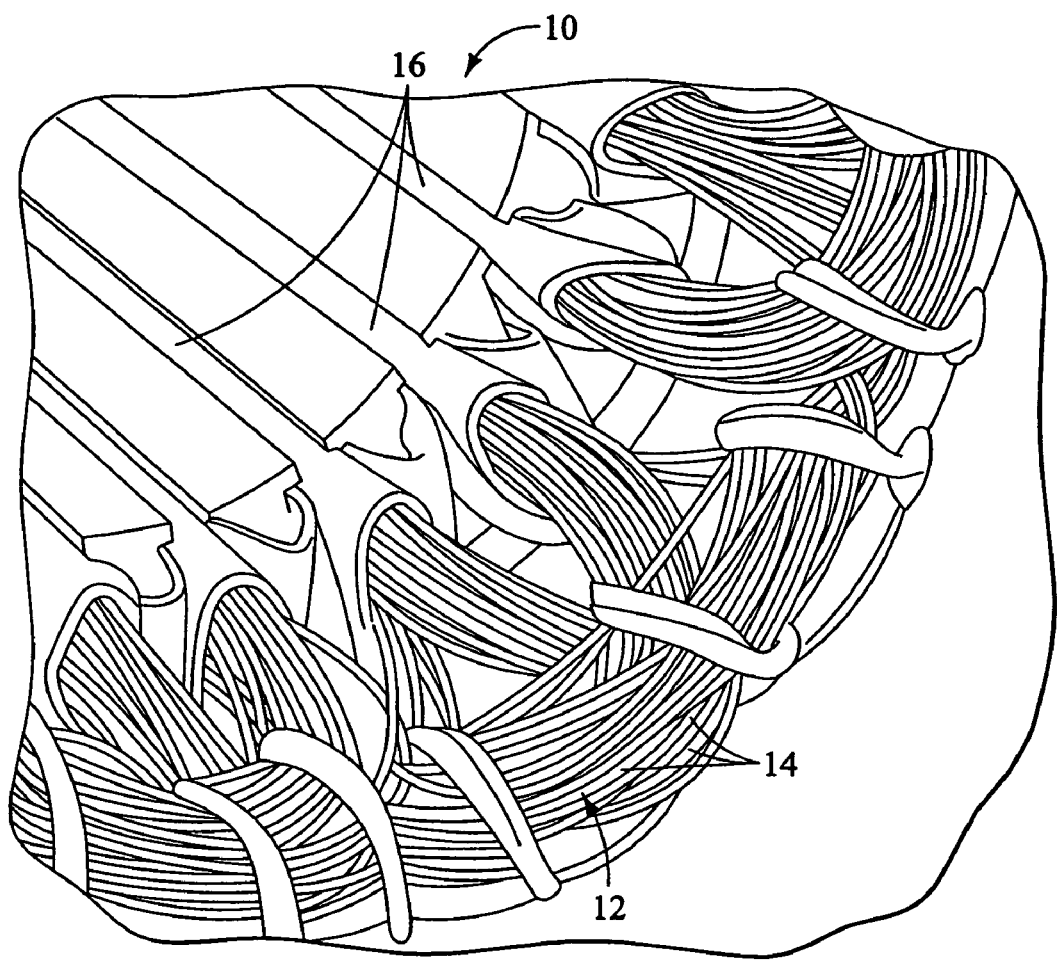
FIG. 3 is a diagram stator of a wound according to the winding configuration shown in FIG. 2.
Figure 4:
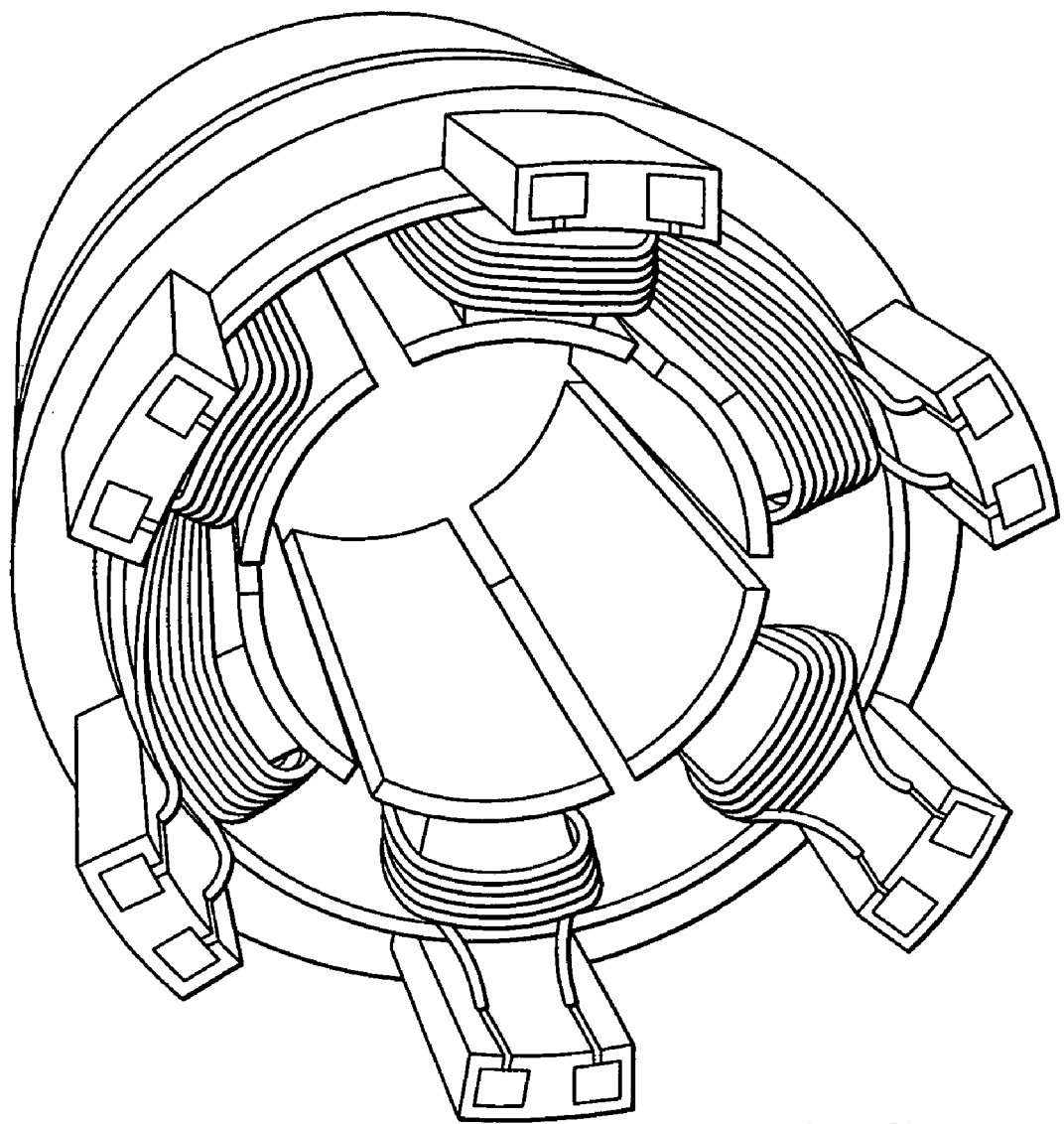
FIG. 4 is a perspective view of a stator with windings that have been wound with a needle winder.

The present invention is generally directed to a class of stator windings that has a stator tooth to rotor pole ratio (S/P) that is within the range of about 0.5 to 1.5. The invention can also be used with a stator designed for operation of the motor having voltage drive up to approximately 680 V DC.

Referring to FIGS. 6–9, a 9-slot stator 18 for a motor having 6 rotor poles (not shown), for example, is shown in accordance with one embodiment of the present invention. The stator 18 is generally adapted to be used for smaller motors, typically, but not limited to less than 100 mm diameter, and includes nine teeth 20–36 and nine slots 38–54 each provided between a pair of teeth (best shown in FIG. 6).

The stator 18 is also provided with an attached front-end insulator 56 and a rear end insulator 58 (best shown in FIGS. 7 and 8) which, in one embodiment, is formed from molded engineered thermoplastic or similar material known in the art. The rear end insulator 58 features a number of recessed pockets 60, through which a wire is routed for purposes of forming a connection by inserting a terminal into the pocket to provide an insulation displacement connection (IDC) and/or an interface termination at this point in the winding. The rear end insulator 58 also includes a system of slits having three different depths 64, 66, 68 (best shown in FIGS. 7 and 8) as an integral part of the molding. These slits 64, 66, 68 provide a mechanism for physically and electrically separating the sections of wire between successive coils 70 from each other, in order to provide a winding that has the capability to withstand high voltage.

Figure 6:
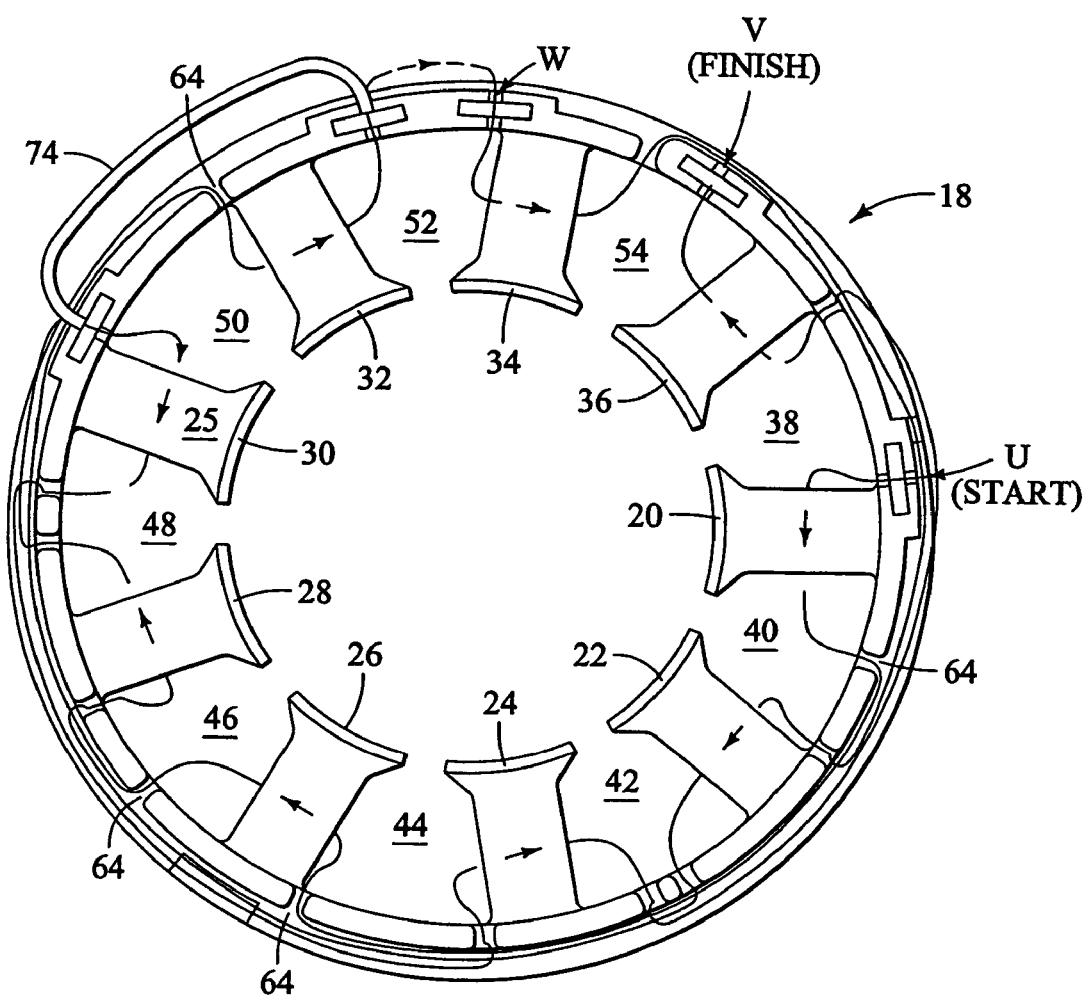
FIG. 6 is a top view of a 9-slot stator illustrating a stator winding pattern in accordance with an embodiment of the invention.
Figure 7:
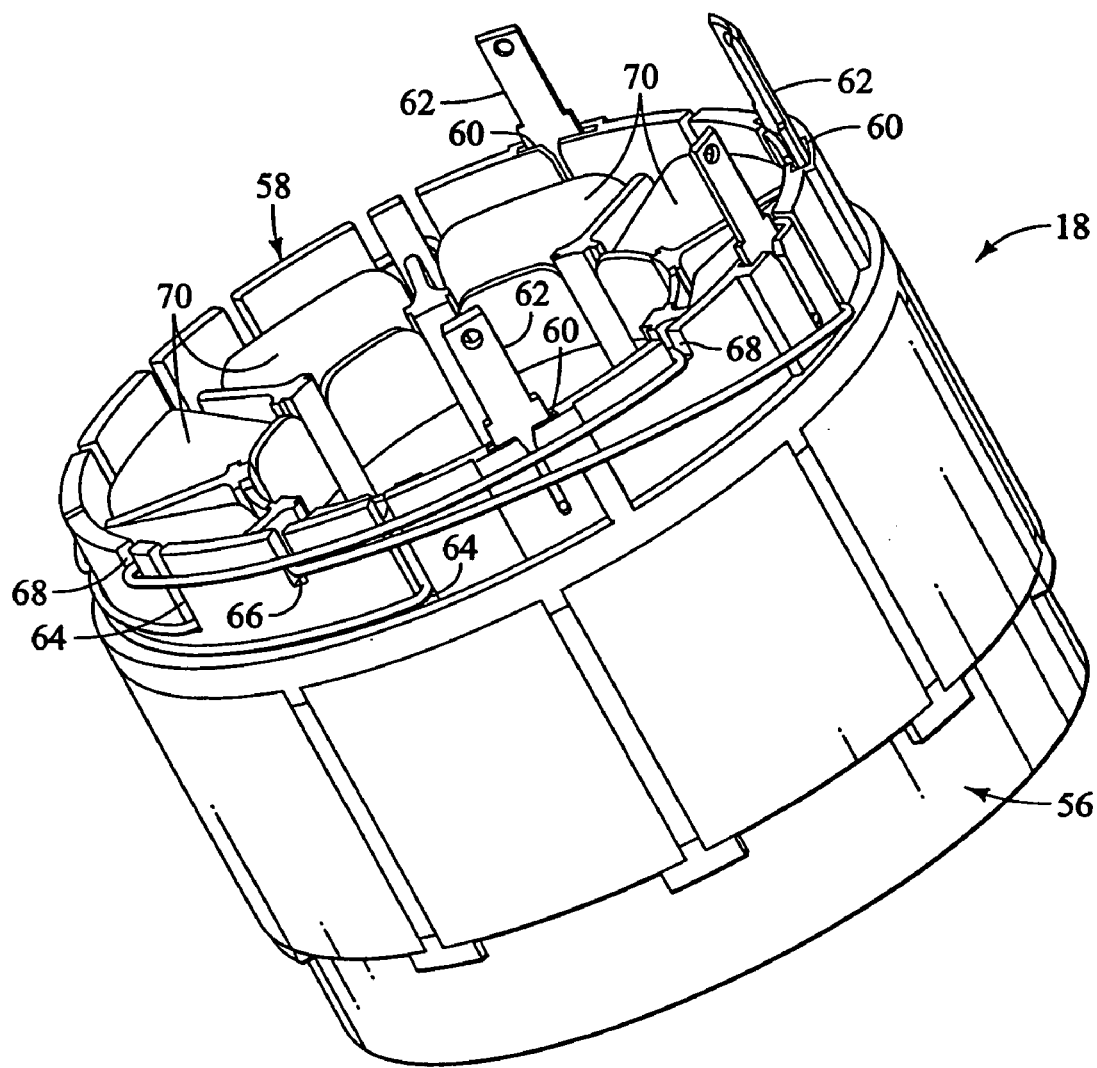
FIG. 7 is a perspective view of a representation of the wound 9-slot stator shown in FIG. 6.
Figure 8:
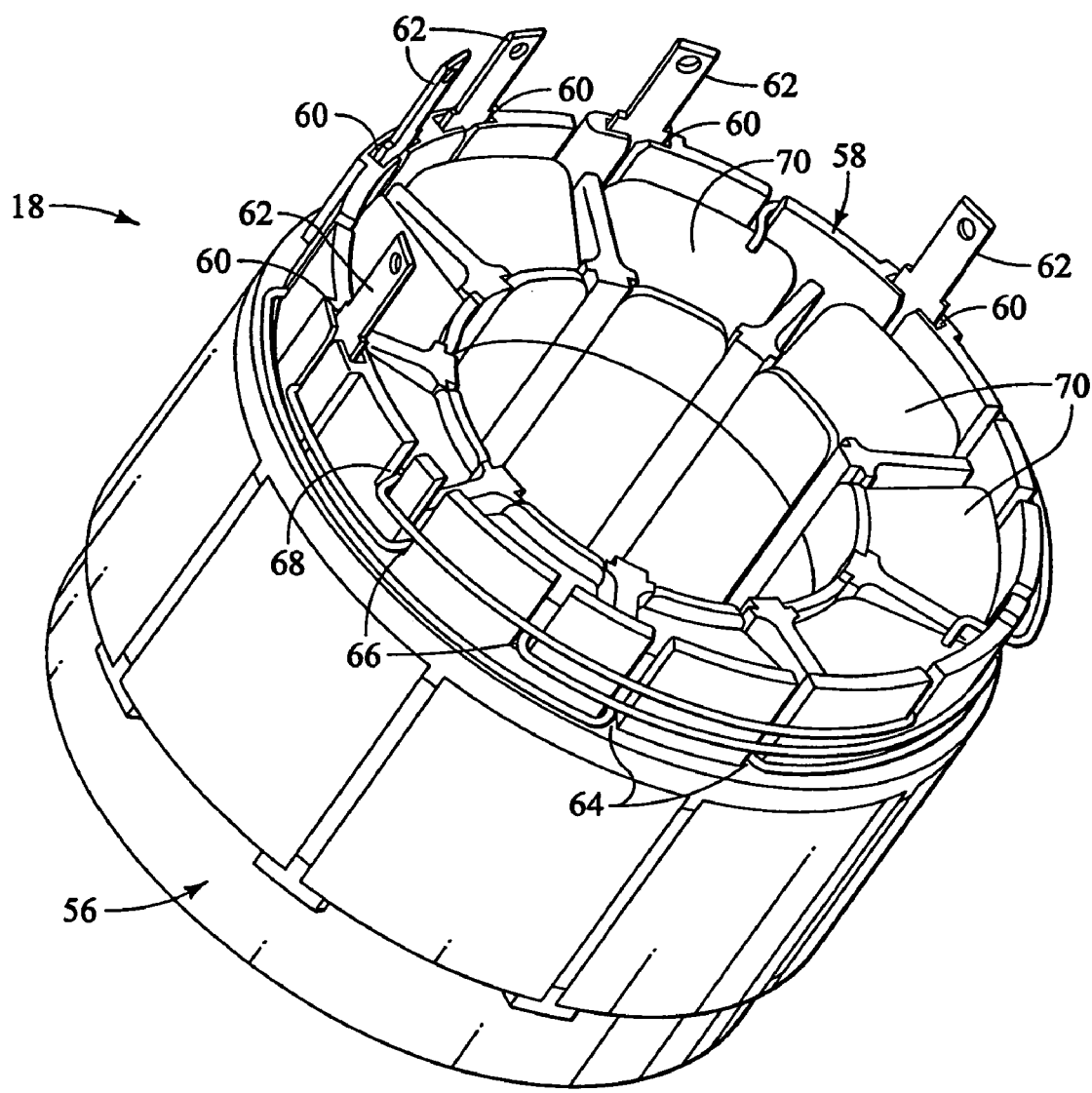
FIG. 8 is another perspective view of the representation of the wound 9-slot stator shown in FIG. 6.
Figure 9:
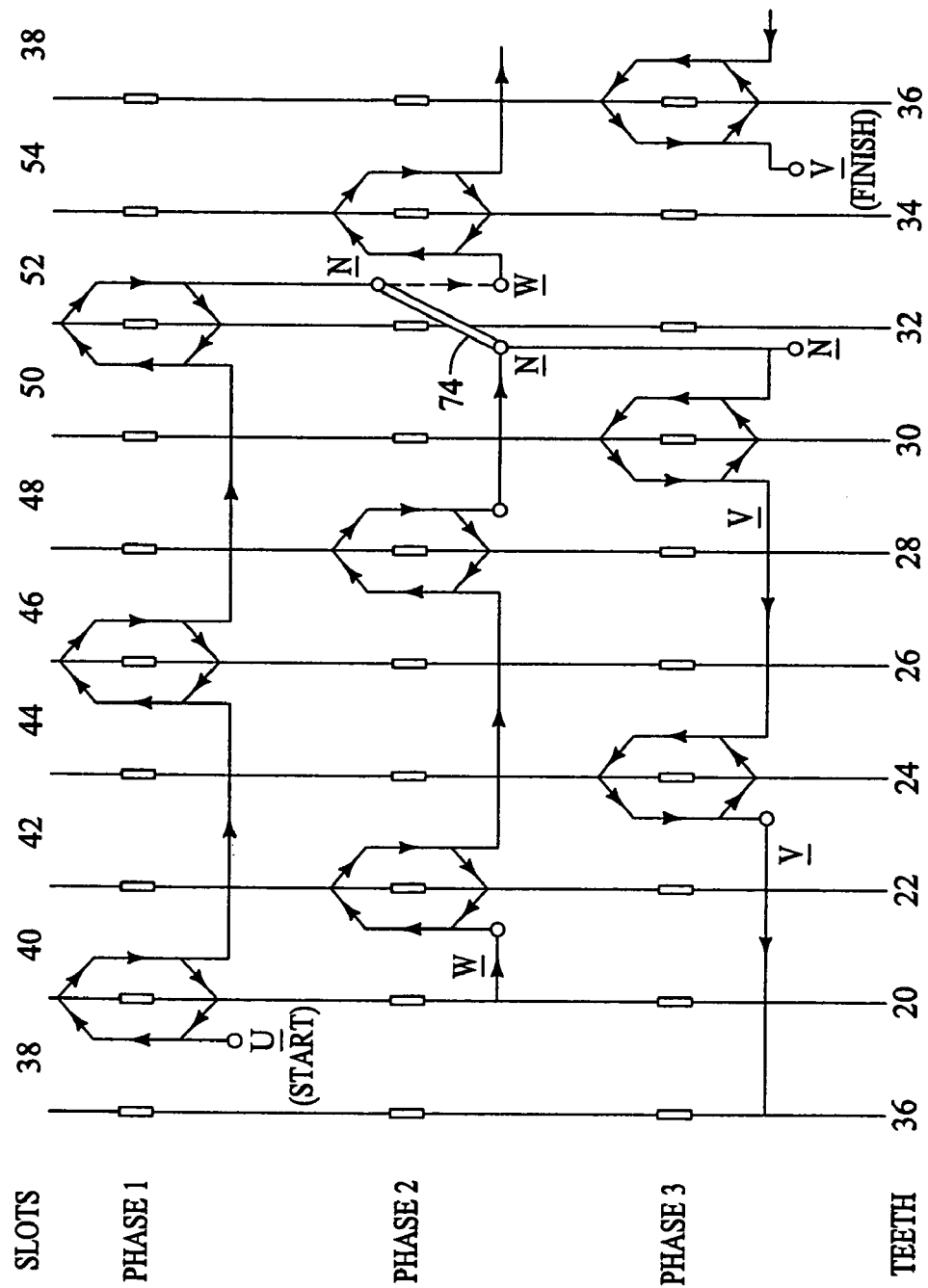
FIG. 9 is a diagram illustrating the winding pattern of the 9-slot stator shown in FIG. 6.

A pattern for winding the stator 18 in accordance with one embodiment of the invention is now described. The arrows in FIGS. 6 and 9 indicate the direction in which the wire is wound around the teeth 20–36. In one embodiment, the stator 18 is wound using a needle winder. Use of "in slot" winder or wire shooter are also contemplated. Referring to FIGS. 6 and 9, winding of the coils 70 starts at the slot 38, where a winding wire 72 representing a lead end U of a first phase is inserted through an IDC pocket 60 near the slot 38, and wound around the tooth 20 (between slots 38 & 40) in a clockwise sense. The wire 72 exits through the deepest end insulation slit 64 of the rear end insulator 58 at the slot 40 (see FIG. 7 or 8). The winding wire 72 then loops over to the slot 44, routing the wire through the deepest end insulator slit 64 at the slot 44. The wire 72 is wound clockwise around the tooth 26, exiting through the deepest end insulation slit 64 at slot 46. The wire 72 then loops over to the slot 50, again routing the wire through the deepest end insulator slit 64. The wire 72 is then wound clockwise around the tooth 32, exiting through an IDS pocket 60 at the slot 52. This point corresponds to the neutral end N of phase 1 in the winding scheme.

Without interrupting the winding route, the wire 72 is routed through another IDC pockets 62 at the slot 52 (see FIG. 6). This section of winding wire 72 will later be sheared off in a post winding operation such that the winding reentry through the second IDC pocket 60 at the slot 52 now represents the start of phase 2, i.e., the lead end W. The winding wire 72 is wound around the first coil of phase 2 clockwise around the tooth 34, and routed out through the mid-depth slit 66 (best shown in FIG. 8) in the rear end insulator 58 at the slot 54. The wire 72 is then looped around the outside of the rear end insulator 58 and routed into the slot 40 through the mid-depth slit 66 at the slot 40, and wound around the tooth 22 in the clockwise direction. The winding wire 72 is then routed through the mid-depth slit 66 at the slot 42 and looped around the outside of the rear end insulator and through another mid-depth slit 66 at the slot 46, where it is wound around the tooth 28 in a clockwise direction, and exits through the mid-depth slit 66 at the slot 48. This position now corresponds to the neutral end N of phase 2. It should be noted that this, and subsequent section of the wire 72 overlaps a section forming phase 1, but since the routing slits 64, 66 in the rear end insulator 58 are at two different depths, these wire sections are physically separated.

Routing the winding wire 72 through the IDC pocket 60 at the rear of the slot 50, winding of phase 3 proceeds in reverse so that the current position corresponds to a joining of the neutral end N of phase 3 and the neutral end N of phase 2 (best shown in FIG. 9). The winding wire 72 entering the slot 50 is wound around the tooth 30 in a counterclockwise direction and routed out of the slot 48 though the low-depth slit 68 (best shown in FIGS. 7 and 8) formed in the rear end insulator 58 at the slot 58. It should be noted that although this portion of winding overlaps a section of winding wire 72 for both phase 1 and phase 2, a physical and an electrical separation are maintained by the different depths of the end insulator slits 64,66,68, thus maintaining high voltage integrity. The winding wire 72 is then looped in a counterclockwise direction and inserted into the slot 44 through the low-depth slit 68, where the winding wire is wound around the tooth 24 in a counterclockwise direction. Exiting through the low-depth slit 68 at the slot 42, the winding wire 72 is then looped in a counterclockwise direction into the slot 38 through the low-depth slit 64 at the slot 34, where the winding wire 72 is wound around the tooth 36 in a counterclockwise direction. Finally, the winding wire 72 is then routed through the IDC pocket 60 at the slot 54. This point corresponds to the effective start of phase 3, i.e., the lead end V.

Once the wire 72 has been wound around all the teeth 20–36 in the manner described above, the IDC terminal 62 are inserted into all five pockets 60 to cut the winding wire at these points. Then, the portion of the wire 72 between the two IDC pockets 60 at the slot 52 is sheared, i.e., between the neutral end N of phase 1 and the lead end W of phase 2, as indicated by a dotted line in FIGS. 6 and 9. A jumper wire 74 is attached between the IDC pocket near the slot 50 and the IDC pocket near the slot 52 which is electrically connected to the tooth 32 (best shown in FIG. 6). This step joins the neutral end N of phase 1 to the common neutral end N of phases 2 and 3 to make a star point connection as shown in FIG. 5. The remaining three IDC terminals 62 represent the termination interfaces or lead ends U, V, W of the three phases.

The present invention can also be described in connection with an embodiment shown in FIGS. 10 and 11, which is a stator 75 for a 10-pole rotor, 12-slot stator motor (not shown), for example. The stator 75 includes twelve teeth 76–98 and twelve slots 100–122. This embodiment illustrates a winding pattern in which the individual coils 70 of a phase are not in simple series connection as in the embodiment described above. In this embodiment, with four coils per phase, the first pair of coils in series are parallel connected by jumper wires J1, J2, J3 to the second pair of coils which are also series connected. Those skilled in the art will recognize that in this arrangement each phase will have two neutral ends N, one for each pair of coils. This embodiment represents a more complicated routing of the wires but nonetheless represents the same principle that was implemented in the embodiment described above.

Figure 10:
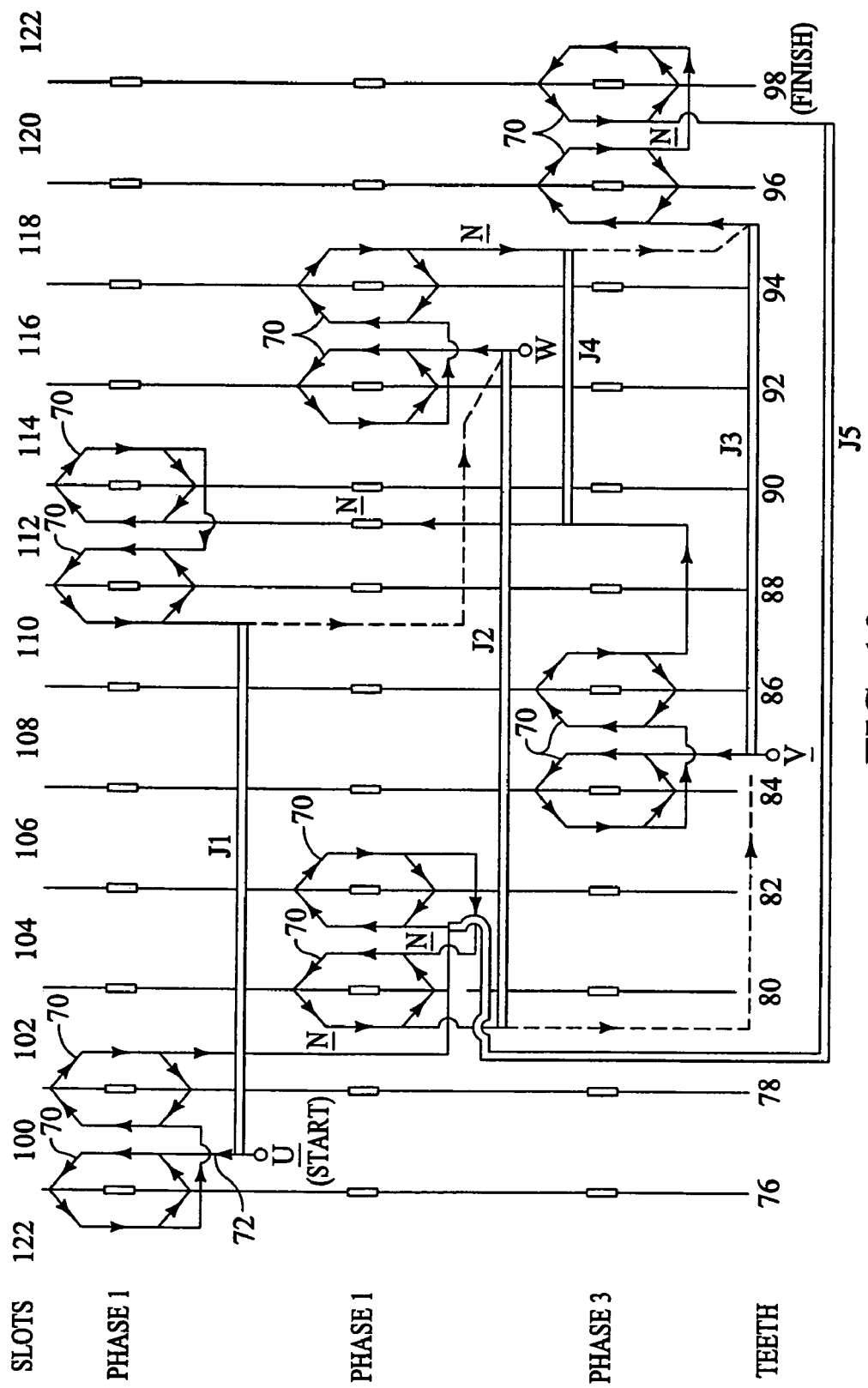
FIG. 10 is a diagram illustrating a winding pattern of a 12-slot stator shown in accordance with another embodiment of the present invention.
Figure 11:
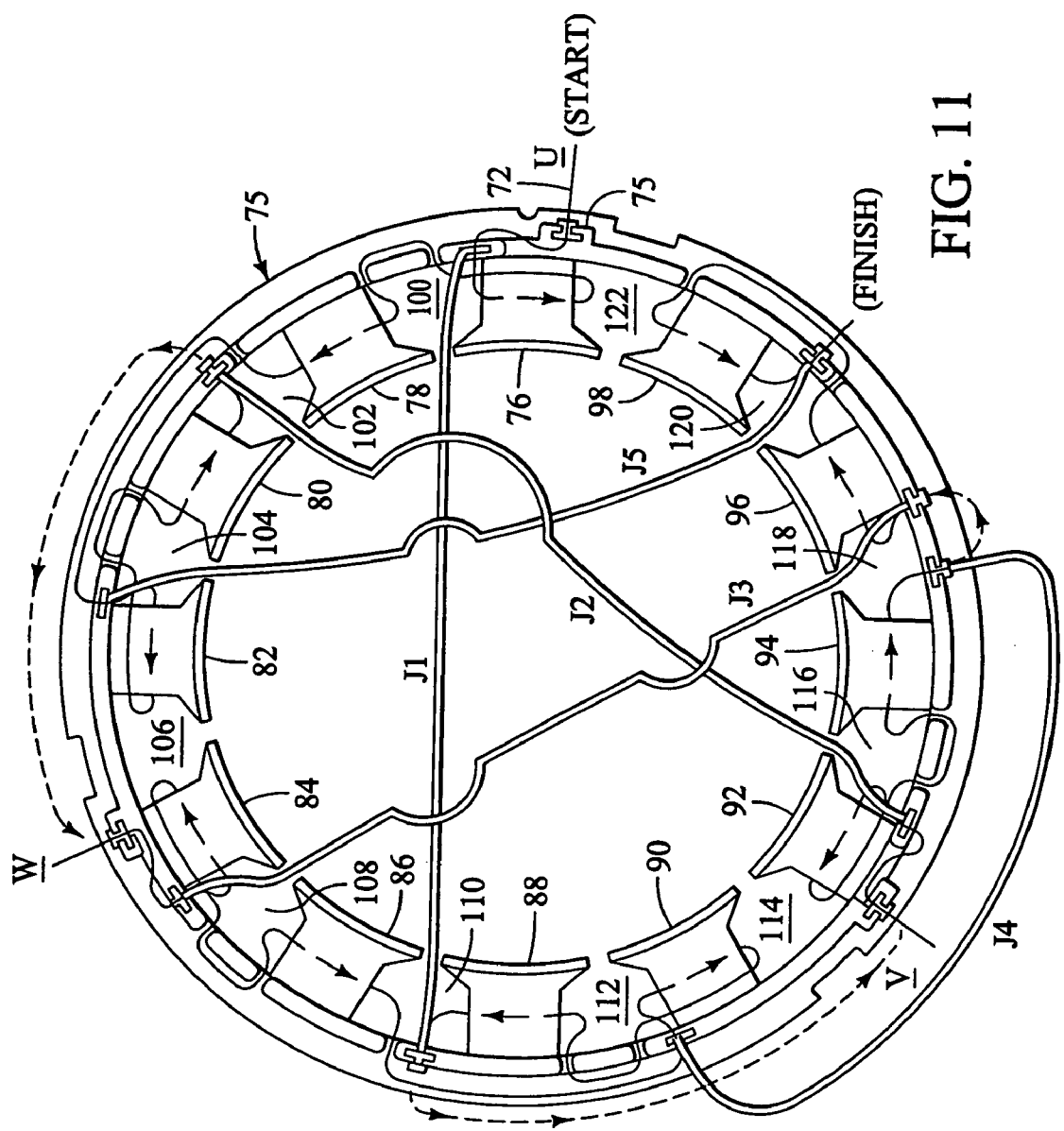
FIG. 11 is a top view of the 12-slot stator wound in the pattern shown in FIG. 10.

More specifically, as shown in FIGS. 10 and 11, the stator 75 is wound starting with a lead end U of the winding wire 72 being inserted into a slot 100 through an IDC pocket 77 near a slot 122. From this point, the wire 72 is wound continuously from the tooth 76 to the last tooth 98 in the directions indicated by arrows on the wire 72 in FIGS. 10 and 11. In the order from start to finish, the teeth of the stator 75 are wound in the following order: Beginning from tooth 76 to 78 to 82 to 80 to 84 to 86 to 90 to 88 to 92 to 94 to 96 and ending with tooth 98.

A jumper wire J1 is connected between the coils 70 formed from teeth 76 and 88 to establish a parallel connection between the two sets of coils in phase 1. Similarly, a jumper wire J2 is connected between the coils formed from teeth 80 and 92 to establish a parallel connection between the two sets of coils in phase 2. In phase 3 a jumper wire J3 makes the parallel connection between the coils 70 formed from teeth 84 and 96.

Figure 12:
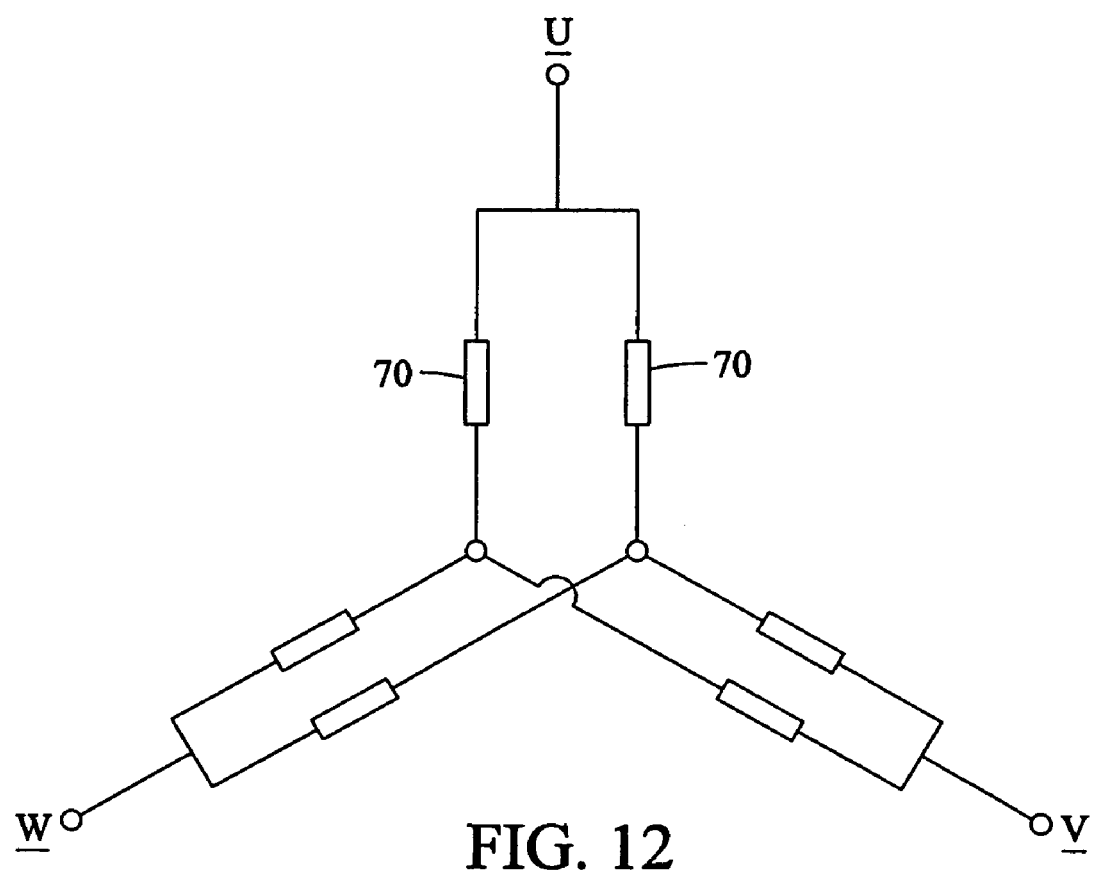
FIG. 12 is a diagram showing the electrical connections of the phases of the 12-slot stator wound as shown in FIG. 10.

A jumper wire J4 is connected between one neutral end N of phase 2 (from the coil 70 formed from the tooth 94) and the first neutral ends N of phases 1 and 3 (the section of wire 72 extending between teeth 86 and 90). A jumper wire J5 connects one neutral N of phase 3 (from the coil 70 formed from the tooth 98) and the second neutral ends N of phases 1 and 2 (the section of wire 72 extending between teeth 78 and 82). In this manner, each of the two neutral ends N in one of phases 1–3 are electrically connected to a respective neutral end N in the other two phases as shown in FIG. 12.

A section of the wire 72 (indicated in dashed lines in FIGS. 10 and 11) connecting the coil 70 formed from the tooth 80 and the coil 70 formed from the tooth 84 is sheared to electrically isolate phases 2 and 3. Similarly, a section of the wire 72 connecting the two coils 70 formed from teeth 88 and 92 are sheared to electrically disconnect phases 1 and 2, and a section of the wire connecting the two coils formed from teeth 94 and 96 are sheared to electrically disconnect phases 2 and 3.

In this embodiment also, the winding wire 72 is routed through the slits 64, 66, 68 with differing depth in the rear end insulator 58 (best shown in FIGS. 7 and 8) to physically separate the wire between successive coils and between the phases. The recessed pockets 60 of the rear end insulators 48 are employed for purposes of forming IDC connections and lead ends in the winding. In this embodiment, the number of post winding jumpers to be inserted increases to 5, the number of sections of winding wire 72 to be sheared off increases to 3 and the number of IDCs employed increases to 13 as shown in FIGS. 10 and 11.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

The invention claimed is:

1. A method for winding a stator of a multi-phase motor, said method comprising the steps of:
   successively winding each of a plurality of teeth on the stator with a continuous first wire to connect each of the phases in the motor together;
   disconnecting said first wire between any two phases where respective ends of the two phases connected by said first wire are not neutral ends; and
   connecting a second wire between a neutral end of any one of the phases to a neutral end of at least one other phase if said neutral end of said any one of said phases is not connected to said neutral end of said at least one other phase by said first wire,
   wherein said first wire connects any two phases where respective ends of said any two phases are neutral ends.

2. The method as defined in claim 1, further comprising the step of routing said first wire through a plurality of slits in an insulator attached to an end of said stator when winding from one tooth to the next tooth.

3. The method as defined in claim 2, wherein said slits have differing depth to prevent said first wire from making electrical contact between any of the phases.

4. The method as defined in claim 1, wherein said stator is wound using a needle winder.

5. The method as defined in claim 1, wherein said stator is wound in a single tooth winding pattern.

* * * * *